United States Patent
Van Dÿk

[19]

[11] Patent Number: 6,126,150
[45] Date of Patent: *Oct. 3, 2000

[54] SUBMERSIBLE MIXING IMPELLER

[76] Inventor: Bernhard Van Dÿk, 5682 Gilpin Street, Burnaby, British Columbia, Canada, V5H 2H9

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/043,328

[22] PCT Filed: Sep. 23, 1996

[86] PCT No.: PCT/CA96/00628

§ 371 Date: Mar. 20, 1998

§ 102(e) Date: Mar. 20, 1998

[87] PCT Pub. No.: WO97/11034

PCT Pub. Date: Mar. 27, 1997

Related U.S. Application Data

[63] Continuation-in-part of application No. 08/532,493, Sep. 22, 1995, Pat. No. 5,660,766.

[51] Int. Cl.[7] ...................................................... B01F 3/04
[52] U.S. Cl. ............................................. 261/87; 261/93
[58] Field of Search ........................... 261/87, 123, 121.1, 261/124, 93

[56] References Cited

U.S. PATENT DOCUMENTS

| | | |
|---|---|---|
| 1,726,125 | 8/1929 | Rowand . |
| 2,609,189 | 9/1952 | Dering . |
| 2,944,802 | 7/1960 | Damen ...................................... 261/87 |
| 3,796,417 | 3/1974 | Kaelin . |
| 3,864,438 | 2/1975 | Nagahama . |
| 3,875,279 | 4/1975 | Kaelin . |
| 4,018,859 | 4/1977 | Müller . |
| 4,283,357 | 8/1981 | Sidery . |
| 4,426,068 | 1/1984 | Gimond et al. . |
| 5,013,490 | 5/1991 | Tanimoto et al. . |
| 5,160,459 | 11/1992 | Guarnaschelli et al. . |
| 5,660,766 | 8/1997 | Van Dÿk ................................. 261/87 |
| 5,925,293 | 7/1999 | Howk ...................................... 261/93 |

FOREIGN PATENT DOCUMENTS

| | | |
|---|---|---|
| 109577 | 1/1940 | Australia . |
| 1101138 | 5/1981 | Canada . |
| 2054044 | 5/1992 | Canada . |
| 0 073 729 | 3/1983 | European Pat. Off. . |
| 0 365 013 | 4/1990 | European Pat. Off. . |
| 1474582 | 3/1967 | France . |
| 1 244 121 | 7/1967 | Germany . |
| 204038 | 11/1983 | Germany ................................. 261/87 |
| 1068397 | 1/1984 | Russian Federation ................. 261/87 |
| 628 867 | 3/1982 | Switzerland . |
| 2 000 038 | 1/1979 | United Kingdom . |

OTHER PUBLICATIONS

Copy of the International Search Report for PCT/CA96/00628.

Copy of the International Search Report for PCT/CA96/00628, Oct. 21, 1997.

*Primary Examiner*—David A. Simmons
*Assistant Examiner*—Robert A. Hopkins
*Attorney, Agent, or Firm*—Merchant & Gould P.C.

[57] ABSTRACT

A rotatable apparatus for introducing and dispersing a fluid, such as gas or liquid, in a liquid has outwardly and rearwardly projecting blades about it periphery and air exit ports immediately rearward of said blades. In one embodiment, the apparatus is an aerator having an upper body, a lower body and replaceable blades affixed between the upper and lower bodies. The blades have a body portion positioned between the upper and lower bodies and a projecting portion extending radially outwards. The upper body has an axial bore which is connected to a rotatable hollow tube open to the atmosphere. As the aerator is rotated by rotation of the tube, air is drawn through the tube into the body of the aerator and is ejected through air exit ports between the blades into the liquid. In another embodiment, the aerator has a plurality of radially extending tubes with air exit ports and radially extending blades proximate their outer ends.

17 Claims, 8 Drawing Sheets

SUBMERSIBLE MIXING IMPELLER

This application is a continuation in part of U.S. patent application Ser. No. 08/532,493, filed Sep. 22, 1995, now issued as U.S. Pat. No. 5,660,766.

FIELD OF THE INVENTION

The invention pertains to a device for introducing and dispersing a fluid in a liquid. More specifically, it relates to a submersible fluid mixing impeller for introducing and dispersing a fluid, such as a gas or liquid, into a liquid. Preferably, the device is used as an aerator for aerating liquid-solid organic waste mixtures in order to accelerate the decomposition of the organic matter.

BACKGROUND OF THE INVENTION

Submersible mixing impellers are known devices with a wide variety of applications for introducing a fluid, such as a gas or liquid, into the liquid in which the device is submerged. For example, they are used to draw air from the atmosphere into a liquid to aerate the liquid.

In the field of organic waste treatment, decomposition of organic matter, such as vegetable wastes and sewage, can be effected by introducing suitable bacteria into a tank containing a slurry of the organic matter in water, while aerating and mixing the slurry. Thorough aeration of the slurry, in the form of fine air bubbles dispersed throughout the slurry, accelerates such decomposition by providing ample oxygen to the bacteria.

Slurries of organic matter typically contain solid matter, namely the organic matter itself or trash such as wrapping materials, which are frequently made of plastic, that accompany the waste. To prevent blockages within the aerator, it is important that it function in a manner which does not draw the slurry into the aerator during the aeration process. It is also desirable for the aerator to draw sufficient air into itself for aeration of the slurry by the simple rotation of the aerator, without the need for any external pump to supply air to the aerator. It is also desirable for the aerator to disperse the drawn air into the slurry as fine bubbles. A need therefore exists for an improved aerator for use in aerating waste slurries.

SUMMARY OF THE INVENTION

It is an object of the invention to provide a rotatable mixing impeller to be submersed in a liquid, the device having peripheral blades extending outwardly from the body of the device with fluid exit ports immediately rearward of such blades which are shielded by the blades as the device rotates in the liquid so that the partial vacuum produced by the rotating blades prevents liquid from entering the ports.

The mixing impellers of the present invention are of the type that are submerged in liquid at the end of a hollow shaft and draw gas or liquid down the shaft as they are rotated, by means of the vacuum drawn by the device. They have a rotatable body which ejects the fluid drawn down the hollow shaft of the device into the liquid in which they are submerged through ports at the circumference of the body, said ports being positioned immediately rearward of outwardly projecting, rearwardly inclined blades. The inventor has found the devices of the present invention, when used as aerators, highly effective in aerating liquid-solid slurries. It is believed that the effectiveness is due to the creation of a strong partial vacuum immediately behind the projecting portion of the blades as the aerator rotates, producing a pocket of water vapor into which air is ejected through the air exit ports before dispersing in the body of the liquid.

According to one aspect of the invention, there is provided an aerator to be submerged in a liquid for introducing and dispersing air in the liquid. The aerator has a lower body, an upper body and a plurality of blades disposed between the upper and lower bodies. The lower and upper bodies are generally circular in horizontal cross-section and are rotatable, together with the blades, as a unit. The blades are spaced apart from each other and have a portion which projects outwardly and rearwardly with respect to the intended direction of rotation of the aerator. The upper body has an axial bore to engage with a rigid air conduit which is open to the atmosphere at its intake end. The axial bore interconnects with spaces between the blades which form air exit conduits. The aerator is submerged in a liquid and is rotated by means of rotating the air conduit. This causes air to be drawn through the air conduit into the aerator and to be ejected and dispersed into the fluid, without intake of the liquid into the air exit conduits.

According to a preferred embodiment of the invention, the blades are removable and replaceable. The blades include a body portion which is positioned between the upper and lower bodies of the aerator. Preferably, the upper body of the aerator is in the shape of an inverted, truncated cone.

According to a further aspect of the invention, the upper body of the aerator extends outwardly over the projecting portion of the blades, and acts as a deflector to prevent air bubbles that are rising from the aerator from being drawn around the blades as the aerator rotates.

According to a further aspect of the invention there is provided an aerator having an axially rotatable hollow shaft which has an air intake at its upper end and which has a plurality of symmetrically disposed tubes extending radially outward from the shaft. Connecting members extend between the outer ends of the radially extending tubes. Blades project outwardly and rearwardly proximate the outer ends of the radially-extending tubes and air exit ports are disposed immediately rearwardly of said blades. When the aerator is submerged in liquid and is rotated by rotation of the shaft air is drawn down through the hollow shaft, through the radially-extending tubes and is ejected into the liquid through the air exit ports.

DETAILED DESCRIPTION OF THE PREFERRED EMBODIMENT

Figure 1:
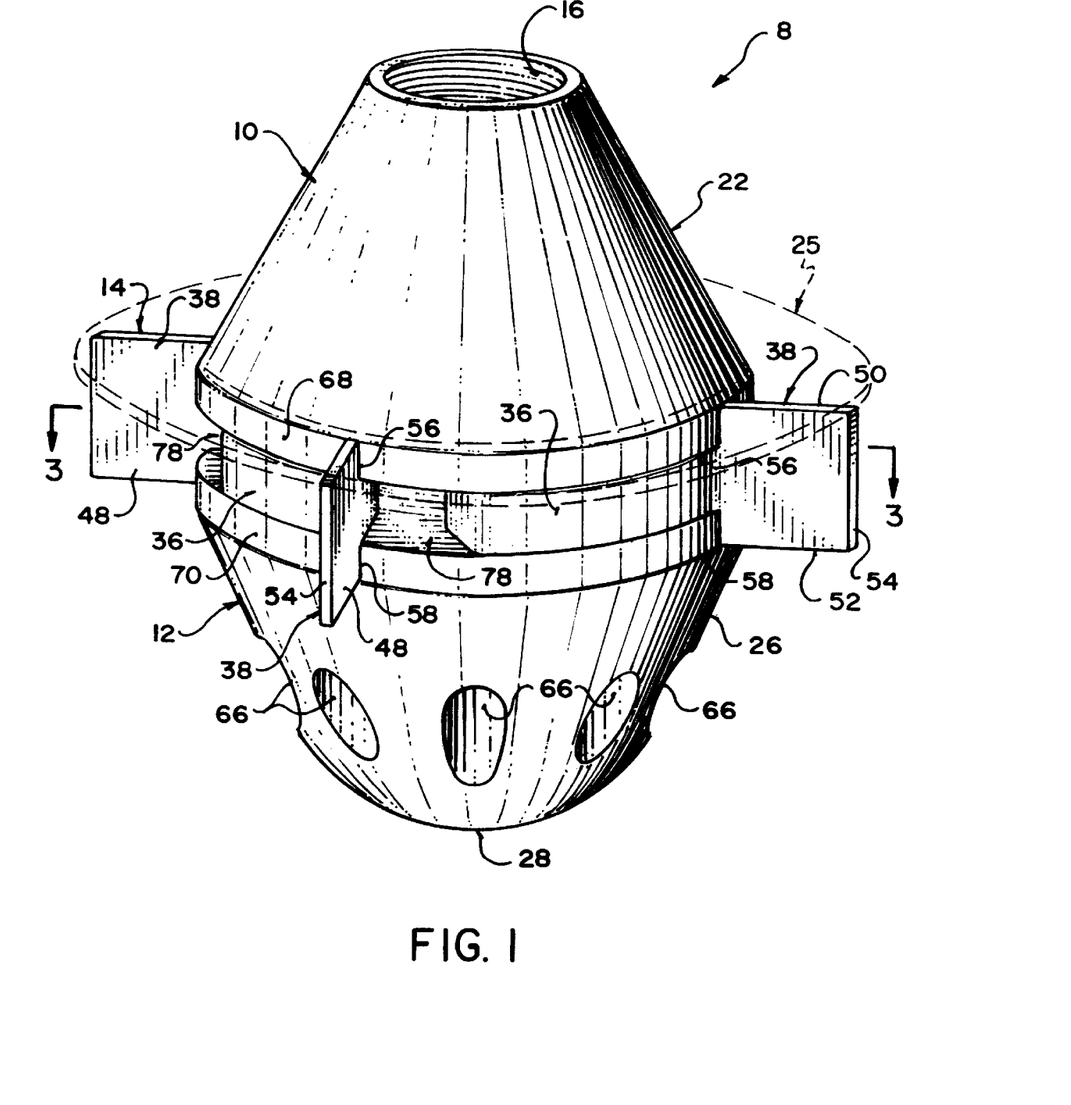
FIG. 1 is a perspective view of a first embodiment of an aerator according to the invention.

Referring to FIG. 1, the first preferred embodiment of the aerator 8 has an upper body 10, lower body 12 and a set of replaceable blades 14. The upper body 10, lower body 12 and blades 14 are fastened rigidly together as a unit by means of bolts 80, as described below.

The upper body 10 has the external shape generally of an inverted, truncated cone. It is radially symmetrical about its vertical axis. It has an outer wall 22 and circumferential rim 68 at its lower edge. Axial bore 16 opens at the upper end of the upper body 10 and is threaded to receive and securely engage a threaded rotatable air tube 74, shown in cross-section in FIG. 4, having a hollow passage therein, which conducts air into the aerator. The air tube 74 is preferably a rigid metal tube.

Figure 4:
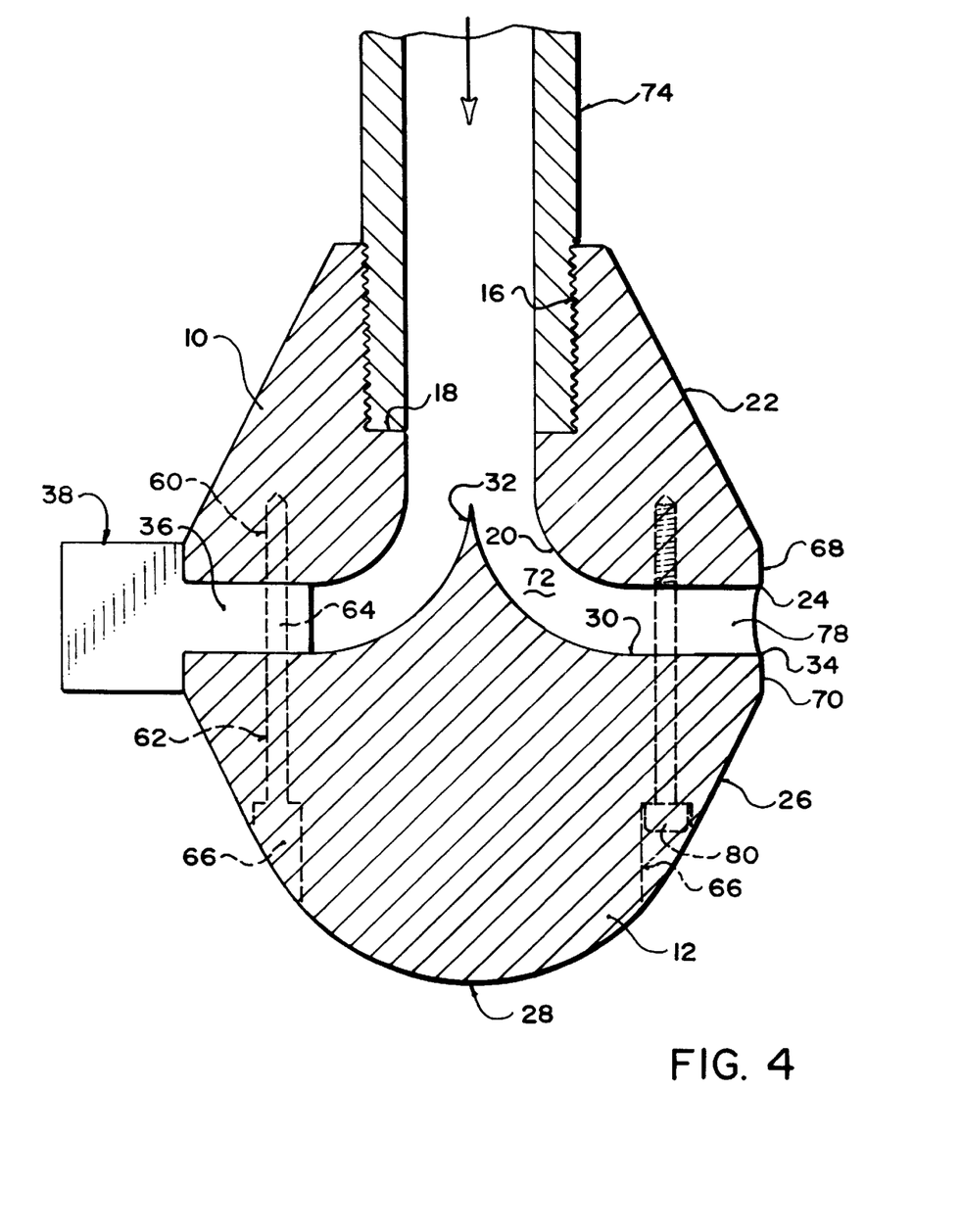
FIG. 4 is a vertical cross-section through the aerator with an air conduit attached, on the line 4—4 of FIG. 3.

Referring to FIG. 4, which shows the internal structure of the aerator, axial bore 16 has shoulder 18 therein. When the air tube 74 is threaded into the axial bore 16, the lower end of the air tube abuts against shoulder 18. Below shoulder 18, the inner wall 20 of upper body 10 tapers downwardly and outwardly, meeting rim 68 at circumferential edge 24 of the upper body.

Referring to FIGS. 1 and 4, the lower body 12 is generally radially symmetrical about its vertical axis. It has a circumferential rim 70, which has the same circumference as circumferential rim 68 of the upper body 10. Below rim 70, outer side wall 26 tapers inwardly in the downward direction, ending in rounded bottom end 28. The upper surface 30 of the lower body 12 has projection 32 in its centre and slopes downwardly and outwardly to meet rim 70 at circumferential edge 34.

Figure 3:
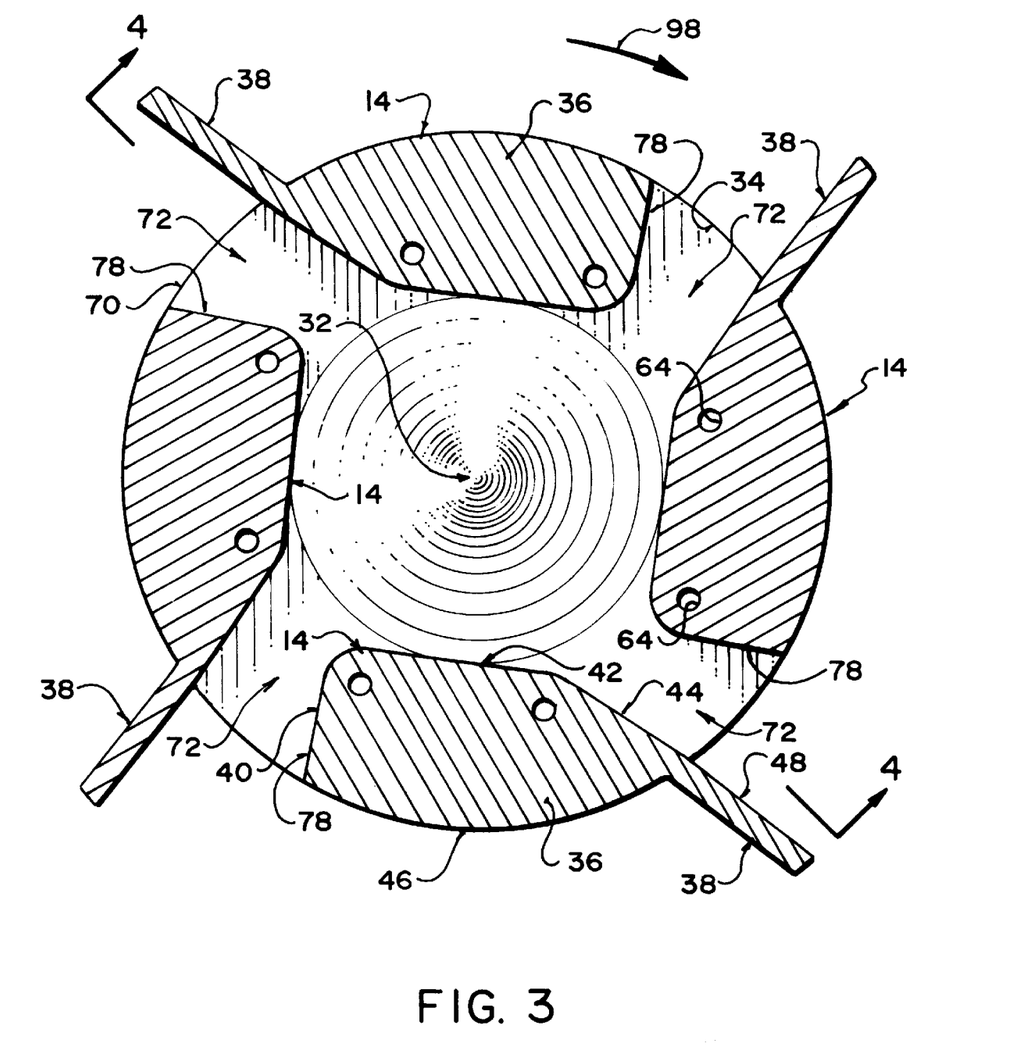
FIG. 3 is a horizontal cross-section on the line 3—3 of FIG. 1.

As shown in FIGS. 1 and 3, blade 14, of which there are four in the first preferred embodiment, has a body portion 36 and a projecting portion 38. Body portion 36 has a forward edge 40, and inner edge 42, an rear edge 44 and an outer edge 46. The radius of curvature of the outer edge 46 is the same as that of rim 68 of upper body 10 and rim 70 of lower body 12. The outer edge 46 and rims 68 and 70 are therefore aligned, as best seen in FIG. 1. Projection portion 38 of the blade 14 extends outwardly beyond outer edge 46 at the rear edge 44 of the blade 14. The trailing side 48 of the projecting portion 38 is contiguous with and in the same plane as rear edge 44. Projecting portion 38 is angled rearwardly at an angle of approximately 20.1±1.5' with respect to a radius of the arc described by outer edge 46 of the blade body 36. The length of the blade body 36 along said arc, from the intersection of said arc with edge 40 to the intersection of said arc with projecting portion 38 is preferably 4.00±0.05 inches.

Projecting portion 38 has upper edge 50, lower edge 52, outer edge 54, and inner edges 56, 58. The height of projecting portion 38 is greater than that of body 36 so that the plane of upper edge 50 is aligned with the top of rim 68 and lower edge 52 is aligned with the bottom of rim 70. The length of projecting portion 38 from inner edges 56, 58 to outer edge 54 is preferably 1.688±0.125 inches.

Upper body 10, lower body 12 and blades 14 are assembled in the following manner. Referring to FIGS. 3 and 4, upper body 10 and lower body 12 each have eight vertical bores 60 and 62 respectively therein, and each of blades 14 have two bores 64 therein. Bores 60 are threaded to engage a bolt. Bores 62 open on the sides of lower body 12 at countersunk openings 66. When the upper and lower bodies and the blades are assembled, bores 60, 62 and 64 align with each other. Bolts 80 are inserted through opening 66 and extend through bores 62, 64 and 60, engaging the threads in bores 60, to securely attach the upper body, lower body and blades together, with the inner edges 56, 58 of the projecting portions 38 abutting rims 68 and 70 respectively.

The assembled aerator has air channels 72 formed between the inner wall 20 the upper body 10 and the upper surface 30 of the lower body 12. Air channels 72 extend from axial bore 16 between the blades 14 and open at the sides of the aerator 8 between the blades 14 at air exit ports 78. The width of each air exit port 78, as measured along the arc described by rim 68 or 70, is preferably 1.5±0.05 inches.

Figure 2:
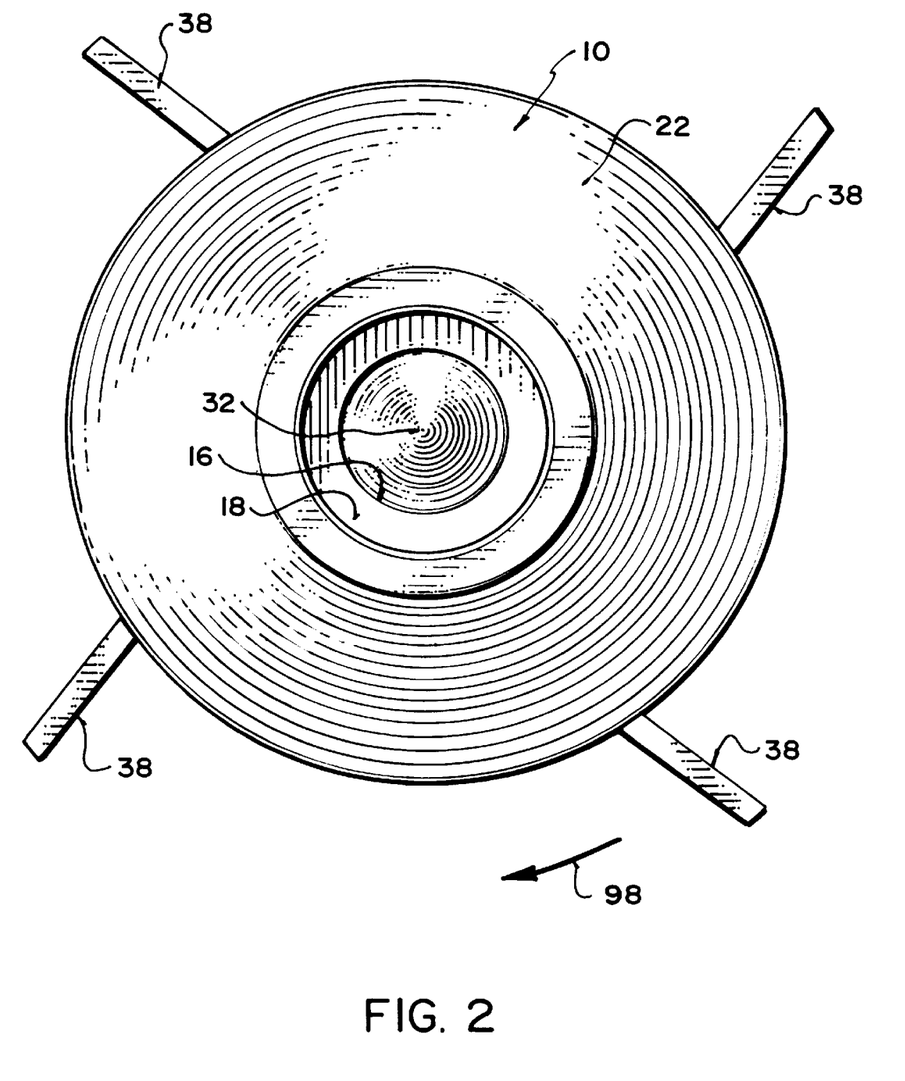
FIG. 2 is a top view of the aerator of FIG. 1.

In use, the aerator is affixed to air tube 74 in a tank (not illustrated) in which an organic waste slurry is to be treated. The slurry preferably contains up to about 11% of solid organic matter. Within the tank, the air tube 74 extends downwards from the top of the tank, supported as required along its length for rotation, by conventional supports and bearings, and holds the aerator near the bottom of the tank. The air tube is open to the atmosphere at its upper end above the surface of the slurry. The air tube 74 is rotated by conventional means, such as an electric motor positioned above the tank, rotating the aerator in the direction shown by the arrows in FIGS. 1, 2 and 3. The aerator is preferably rotated at about 1500 rpm for the four-blade embodiment having the preferred dimensions stated above, resulting in a speed of rotation at the tips of the blades of about 69.5 feet/sec. The spinning causes a vacuum to be drawn down the passageway in air tube 74, through air channels 72 and to be expelled through air exit ports 78 and into the slurry as fine bubbles. In relatively deep tanks, for example where the depth of the slurry is over about twelve feet, it is preferable to have supplementary mixing of the slurry beyond that provided by the aerator, for example by means of rotating paddles.

The first embodiment of the invention has been illustrated with four blades. However, the aerator may have other numbers of blades, for example six blades or eight blades. The preferred dimensions for the blades, blade angle, exit port width and blade tip speed for such embodiments is the same as those set out above as preferred for the four-blade aerator. To achieve the same blade tip speed, the speed of rotation for the six blade aerator would accordingly be about 1000 rpm, and for the eight-blade embodiment about 750 rpm.

Figure 5:
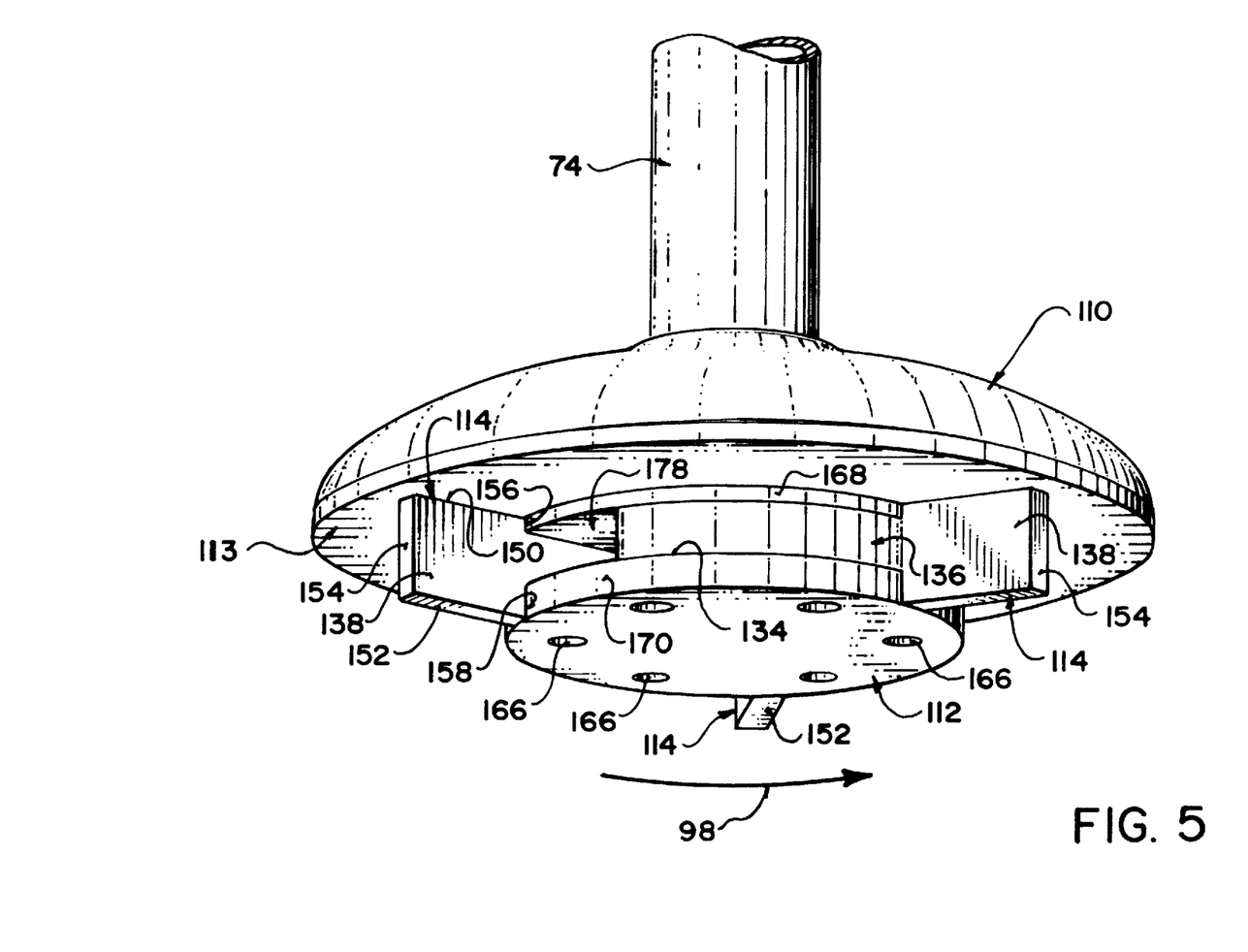
FIG. 5 is a perspective view of a second embodiment of an aerator.

Referring next to FIG. 5, there is shown an embodiment of the invention in which the upper body of the aerator extends outwardly over the blades. This aerator comprises principally upper body 110, lower body 112 and replaceable blades 114, of which there are three in the embodiment illustrated, though the aerator can have more or fewer blades. Upper body 110 has an axial bore (not shown) therein which is threaded to a rigid rotatable air tube 74 having a hollow passage therein. Upper body 110 is larger in diameter than the circumference defined by the outer edges 154 of the blades 114 and extends over and radially outward of them. The lower rim 113 of the upper body 110 abuts the upper edge 150 of the projecting portion 138 of the blades 114. The upper body 110 has a circumferential shoulder 168 which abuts upper inner edge 156 of the projecting portion 138. Lower body 112 of the aerator has outer circumferential rim 170 which abuts lower inner edge 158 of the projecting portion 138 of the blades 114. Lower body 112 is held to upper body 110 by means of blots in bores 166, in the same way as in the first embodiment. Lower body 112 has an upper surface (not shown) the same as the upper surface of lower body 12 of the first embodiment, and slopes downwardly and outwardly to meet rim 170 at circumferential edge 134. Air channels are present extending from air tube 74 through to the air exit ports 178 between body portion 136 of each blade and projecting portion 138 of the adjacent blade, as with the first embodiment.

The purpose of having an upper body 110 which extends outwardly beyond the ends of the blades is to deflect air bubbles rising from the aerator from being drawn down onto the blades as the aerator rotates. By deflecting air bubbles away from the blades, liquid unmixed with air is drawn to the blades from below as air rises from the aerator, producing smoother rotation of the aerator. It is possible to achieve the same result by modifying the first embodiment of the aerator by adding thereto a circumferential ring extending over the projecting portion of the blades. Thus, although it is preferred that the deflector be integral with the upper body, as in the embodiment of FIG. 5, it can be a separate component attached to the upper body or affixed between the blades and the upper body (best seen in phantom in FIG. 1 and designated at 25).

In the aerator of FIG. 5, the length of the projecting portion 138 of the blades, the rearward angle of the projecting portion, the length of the body portion of the blades and the tip speed of the blades when the aerator is rotated, are preferably the same as for the embodiment of FIGS. 1–4.

Figure 6:
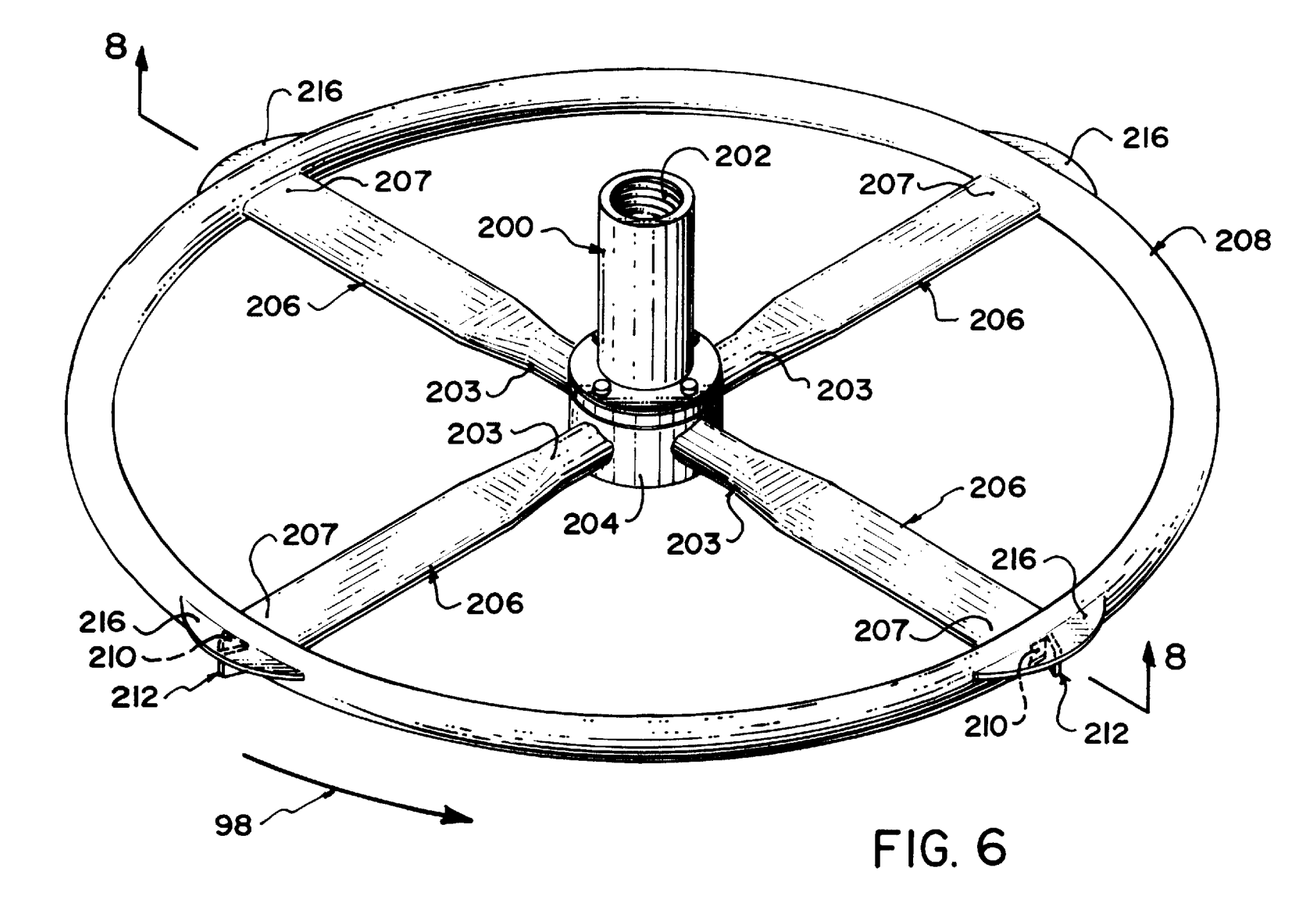
FIG. 6 is a perspective view of a third embodiment of an aerator.
Figure 7:
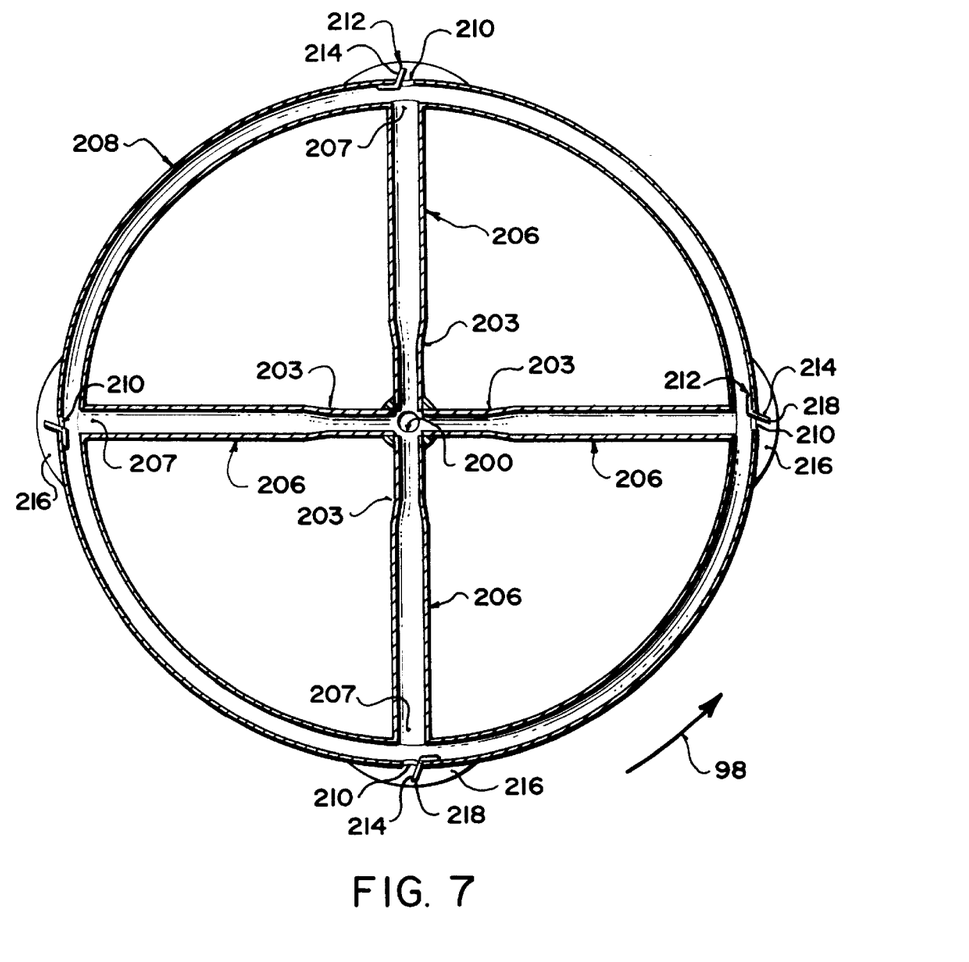
FIG. 7 is a bottom cross-section view of the embodiment of FIG. 6.
Figure 8:
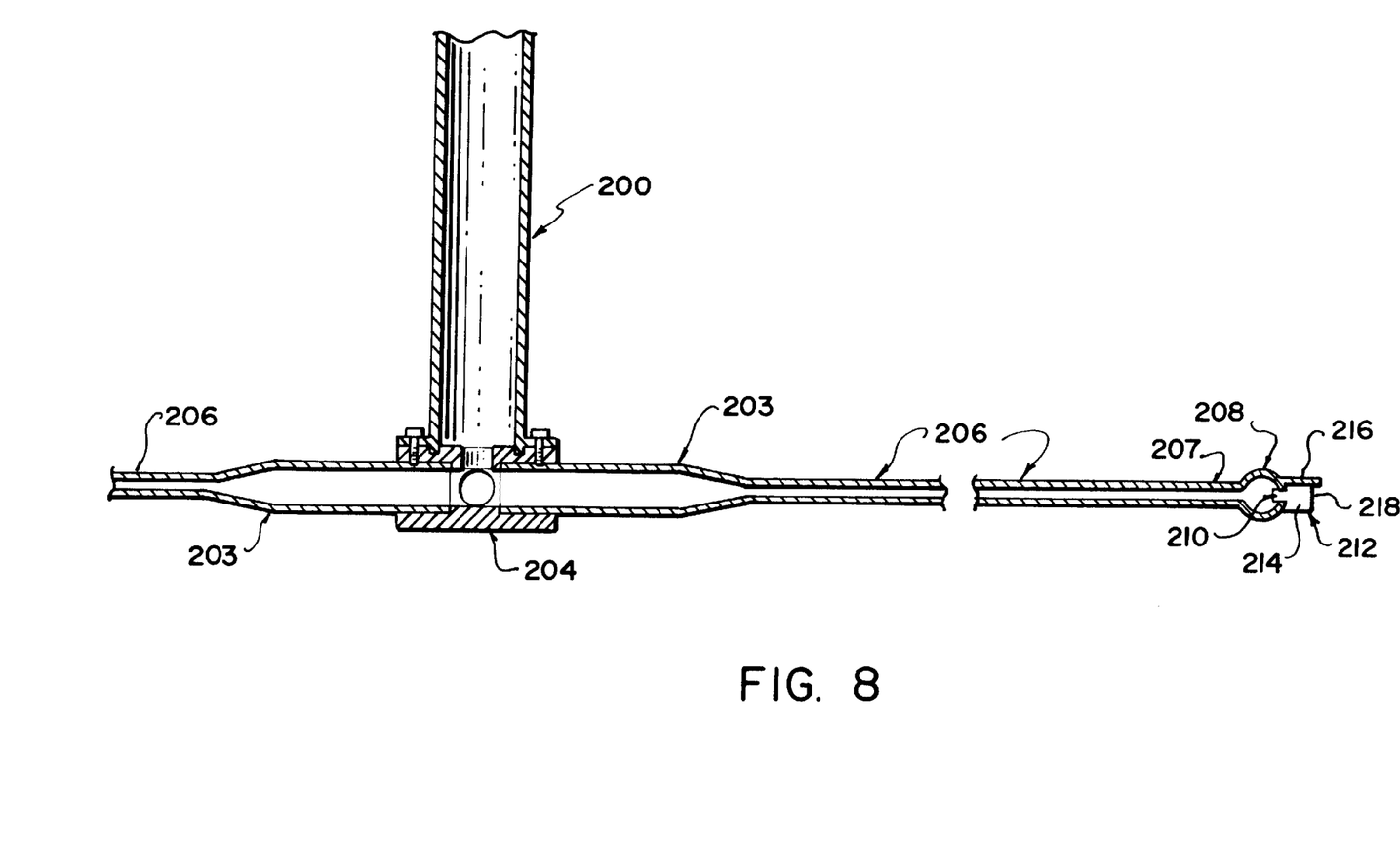
FIG. 8 is a cross-section view on the line 8—8 of FIG. 6.

Referring next to FIGS. 6–8 which illustrate a third embodiment of the invention, the aerator comprises a wheel-like structure in which the air is dispersed at the rim of the wheel as the aerator is rotated. This form of aerator is intended to be substantially larger than the first and second embodiments. For example, the diameter of the third embodiment may be about 10 feet, for use in a tank about 14 feet in diameter.

The aerator has a rigid hollow shaft 200 open at its upper end 202 and closed at its lower end by plate 204. Shaft 200 is threaded on its inner wall and is intended to be connected to extension shafts as required to make a shaft of the desired length, i.e. sufficient to extend above the surface of the liquid in which the aerator is submerged. Four tubes 206 extend radially outward from shaft 200 at the lower end thereof. Tubes 206 are circular in cross-section adjacent shaft 200 and are flattened somewhat, outward of the point marked 203 in FIG. 6, in order to reduce the resistance of the tubes 206 in the liquid as the aerator is rotated.

Connecting member 208 extends circumferentially between the outer ends 210 of tubes 206. As shown in FIGS. 7 and 8, shaft 200, radial tubes 206 and connecting member 208 are hollow with a passage therethrough.

At the end of each radial tube 206 there is, in connecting member 208, an air exit port 210, axially aligned with each of tubes 206. Blades 212 are bolted to the wall of connecting member 208 and having a projecting portion 214 which projects through air exit port 210 radially outwardly and rearwardly with respect to the intended direction of rotation of the aerator, which is indicated by the arrow in FIGS. 6 and 7. Deflectors 216 are affixed to the connector member 208 and extend radially outwardly therefrom immediately above each of the blades 212 and air exit ports 216, extending outward beyond the outer edge 218 of blades 212.

In use, the aerator of FIGS. 6–8 is open to the atmosphere when submerged in liquid in a tank by means of hollow shaft 200 and one ore more extensions thereto, of sufficient length to extend above the surface of the liquid. The aerator is mounted in the tank with the rotatable shaft 200 and extensions thereto supported by suitable and conventional mountings and bearings for rotation about a preferably vertical axis by an electric motor situated above the tank. The aerator is preferably rotated at a speed such that the speed of the blade tips is about 69.5 feet per second. This causes air to be drawn from the atmosphere down through shaft 200, through radial tubes 206 and to be ejected into the fluid through air exit ports 210. Deflector plates 216 deflect air bubbles in the fluid immediately above the aerator from being drawn down about the blades as the aerator rotates. This reduces the vibration of the aerator.

In the embodiment illustrated, connector tube 208 is a hollow tube. However, the aerator also functions satisfactorily with no air passage through the connector tube between adjacent radial tubes 206, since each air exit port 210 is fed directly by a radial tube 206. However, if desired, additional air exit ports and blades can be positioned about the periphery of the connector tube, at positions other than the ends of the radial tubes 206, and in such case the connector member 208 must have an air passage therethrough to permit air to flow from the radial tubes 206 to such ports. Connector member 208 can also conveniently be square or rectangular in cross-section.

The aerator of FIGS. 6–8 can have various numbers of radial tubes 206 rather than the four shown. Such tubes should be symmetrically disposed about shaft 200 so the aerator is balanced during aeration. The length of the projecting portion of the blades, the rearward angle of the projecting portion, and the size of the exit ports are preferably the same as for the embodiment of FIGS. 1–4.

The apparatus of the invention has been described herein principally for use as an aerator for example for introducing air into a liquid solid slurry of organic waste in water. However, it is equally applicable for mixing any gas or liquid with a liquid and can be used in a wide variety of applications where such mixing is required.

What is claimed is:

1. An apparatus to be submerged in a liquid for introducing and dispersing a fluid in said liquid, comprising;
   (a) a lower body;
   (b) an upper body co-axially affixed to said lower body;
   (c) said lower and upper bodies being generally circular in horizontal cross-section and being rotatable about a vertical axis;
   (d) a plurality of blades disposed between said upper and lower bodies, said blades being spaced apart from each other and having a body portion positioned between said upper and lower bodies of said apparatus and having a forward edge and a rearward edge, with respect to the intended direction of rotation of said apparatus, an outer edge, and a portion projecting radially outwardly beyond the circumference of at least said lower body and rearwardly with respect to the intended direction of rotation of said aerator, said projecting portion being contiguous with said rearward edge of said blade body portion;
   (e) said upper body having an axial bore to engage with a rotatable shaft with a hollow passage therein which has a fluid intake at an upper end thereof, for conducting fluid into said apparatus, said axial bore being interconnected with fluid exit ports which are between said blades and immediately rearward of said blades, each said exit port being spaced from a radially adjacent exit port by said blade body portion of a blade;
   (f) whereby when said apparatus is submerged in said liquid and axially rotated by rotation of said rotatable shaft, said rotation of said apparatus causes fluid to be drawn through said shaft into said apparatus and ejected into said liquid through said fluid exit ports, without intake of said liquid into said fluid exit ports.

2. An apparatus according to claim 1 wherein said projecting portion of said blades extends radially outwardly beyond the both said upper and lower bodies of said apparatus.

3. An apparatus according to claim 1 further comprising a deflector extending radially outward above said projecting portion of said blades.

4. An apparatus according to claim 1 wherein said blades are removable and replaceable.

5. An apparatus according to claim 1 wherein said projecting portion is inclined rearwardly at an angle in the range of 20.1±1.5° with respect to a radius of the arc described by said outer edge of said body of said blade.

6. An apparatus according to claim 1 wherein the width of each said fluid exit ports about the circumference of said lower body is in the range of 1.5±0.05 inches.

7. An apparatus according to claim 1 wherein the length of said body portion of said blades, measured along the arc described by said outer edge of said body portion between the intersection of said outer edge with said forward edge and the intersection of said outer edge with said projection portion of said blade, is in the range of 4.00±0.05 inches.

8. An apparatus according to claim 1 wherein the length of said projecting portion of said blades is in the range of 1.688±0.125 inches.

9. An apparatus according to claim 1 in combination with a liquid in which said apparatus is submerged, said liquid containing up to 11% solid organic matter.

10. An apparatus according to claim 1 wherein said outer edge of said blade body portions is substantially aligned with the circumference of said lower body.

11. An apparatus according to claim 1 wherein said upper body extends radially outward above said projecting portion of said blades.

12. An apparatus according to claim 1 wherein said upper body is in the shape of an inverted, truncated cone.

13. An apparatus to be submerged in a liquid for introducing and dispersing a fluid in said liquid, comprising;
   (a) a lower body;
   (b) an upper body co-axially affixed to said lower body;
   (c) said lower and upper bodies being generally circular in horizontal cross-section and being rotatable about a vertical axis;
   (d) a plurality of blades disposed between said upper and lower bodies, said blades being spaced apart from each other and having a body portion projecting radially outwardly beyond the circumference of at least said lower body and rearwardly with respect to the intended direction of rotation of said aerator;
   (e) said upper body having an axial bore to engage with a rotatable shaft with a hollow passage therein which has a fluid intake at an upper end thereof, for conducting fluid into said apparatus, said axial bore interconnecting with fluid exit ports between said blades;
   (f) whereby when said apparatus is submerged in said liquid and axially rotated by rotation of said rotatable shaft, said rotation of said apparatus causes fluid to be drawn through said shaft into said apparatus and ejected into said liquid through said fluid exit ports, without intake of said liquid into said fluid exit ports
   (g) wherein said upper body extends radially outward above said projecting portion of said blades.

14. An apparatus to be submerged in a liquid for introducing and dispersing a fluid in said liquid, comprising;
   (a) a lower body;
   (b) an upper body co-axially affixed to said lower body;
   (c) said lower and upper bodies being generally circular in horizontal cross-section and being rotatable about a vertical axis;
   (d) a plurality of blades disposed between said upper and lower bodies, said blades being spaced apart from each other and having a body portion positioned radially outwardly beyond the circumference of at least said lower body and rearwardly with respect to the intended direction of rotation of said aerator;
   (e) said upper body having an axial bore to engage with a rotatable shaft with a hollow passage therein which has a fluid intake at an upper end thereof, for conducting fluid into said apparatus, said axial bore interconnecting with fluid exit ports between said blades;
   (f) whereby when said apparatus is submerged in said liquid and axially rotated by rotation of said rotatable shaft, said rotation of said apparatus causes fluid to be drawn through said shaft into said apparatus and ejected into said liquid through said fluid exit ports, without intake of said liquid into said fluid exit ports
   (g) wherein each of said blades comprises said projecting portion and a body portion, said body portion being positioned between said upper lower bodies of said apparatus and having a forward edge and a rearward edge, with respect to the intended direction of rotation of said apparatus, and an outer edge, said projecting portion being contiguous with said rearward edge of said body portion;
   (h) wherein said upper body is in the shape of an inverted, truncated cone.

15. An apparatus to be submerged in a liquid for introducing and dispersing fluid in said liquid, comprising:
   (a) an axially rotatable shaft with a hollow passage therein;
   (b) a fluid intake to said hollow passage at an upper end of said shaft;
   (c) a plurality of tubes extending radially outward in symmetrical array from said shaft and in fluid communication therewith;
   (d) connecting members extending between said tubes proximate the outer ends thereof;
   (e) a plurality of blades each having a portion thereof projecting radially outward and rearward with respect to the intended direction of rotation of said apparatus;
   (f) a plurality of fluid exit ports positioned immediately rearwardly of said blades, said fluid exit ports being in fluid communication with said tubes;
   (g) whereby when said apparatus is submerged in said liquid and is axially rotated about said shaft, said rotation causes fluid to be drawn down into said shaft and through said tubes and be ejected into said liquid through said fluid exit ports, without intake of said liquid into said fluid exit ports.

16. An apparatus in accordance with claim 15 wherein said connecting members have a hollow passage therethrough in fluid communication with said tubes and form a circumferential ring connecting the outer ends of said tubes.

17. An apparatus according to claim 15 further comprising a plurality of deflector plates extending radially outward from said connecting members above said blades and fluid exit ports.

* * * * *